M. LACHMAN.
PROCESS OF ELECTRIC WELDING.
APPLICATION FILED MAR. 3, 1908.
923,128.
Patented May 25, 1909.
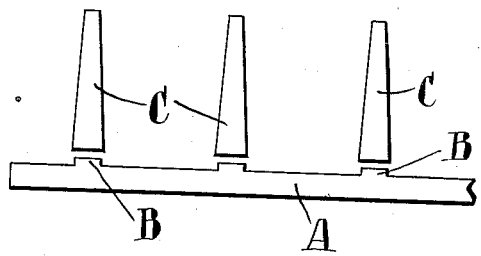
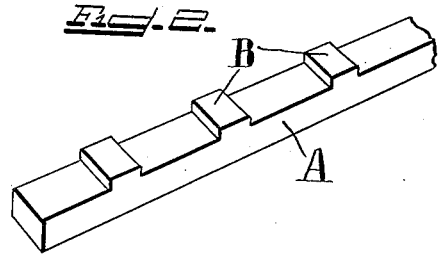
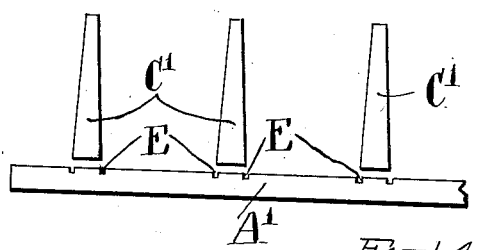
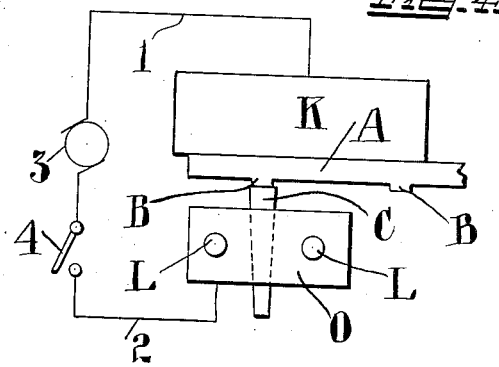
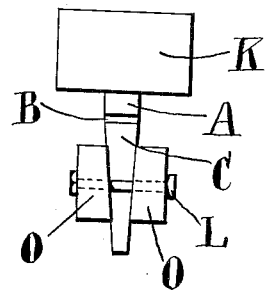
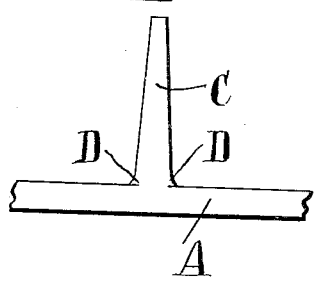
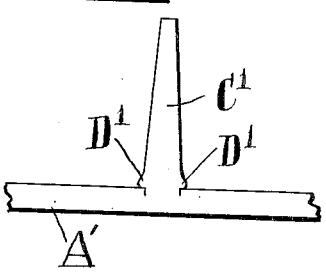
Attest:
Inventor:
Maurice Lachman
by Dickerson, Brown, Raegener & Matty
Atty's

UNITED STATES PATENT OFFICE.

MAURICE LACHMAN, OF NEW YORK, N. Y.

PROCESS OF ELECTRIC WELDING.

No. 923,128.　　　　Specification of Letters Patent.　　　Patented May 25, 1909.

Original application filed October 17, 1906, Serial No. 339,339. Renewed November 29, 1907, Serial No. 404,377. Again renewed August 22, 1908, Serial No. 449,218. Divided and this application filed March 3, 1908, Serial No. 418,949.

*To all whom it may concern:*

Be it known that I, MAURICE LACHMAN, a citizen of the United States, residing in the city of New York, county of New York, and State of New York, have invented a certain new and useful Process of Electric Welding; and I do hereby declare the following to be a full, clear, and exact description of the same, such as will enable others skilled in the art to which it appertains to make and use the same.

This invention relates to processes of electrical welding and consists in a method of electrically welding rods, teeth, tines and similar elongated metal objects to plane surfaced metal objects, which comprises the provision upon such plane surfaced objects of a lug or spur of cross sectional area about corresponding to that of the other element to be welded thereto, placing such element and such lug in abutting contact, passing a welding current through such contact by simultaneously pressing the metal objects together until coalescense and integral union occur at such contact, and finally discontinuing the welding current; all as more fully hereinafter set forth and as claimed.

In the prior art, the formation of such articles as tined tools in which rods, teeth, tines and the like project from a metal surface, has been attended with considerable difficulty. Such tools are frequently required to withstand great stresses and strains, as in the use of a pitch fork or rake, and in practice the projecting bit of metal must be very firmly united. Rivets, bolts and the like do not provide unions sufficiently strong in many cases and tined tools are therefore frequently made of an integral structure by forging and similar relatively expensive methods.

It is the purpose of the present invention to provide a cheap, simple, and ready remedy by which tined tools and similar articles may be made by assembling small separately made parts and uniting them by an integral union producing articles similar to the forged articles and as strong or stronger in a cheaper and more advantageous way.

Efforts have been made to accomplish the results of the present method by directly abutting tines and the like to the surface of a holding element, as, for instance, by welding a rake tooth directly to the flat surface of a rake back. This, however, has not proved practicable. The amount of current which will raise the base of the tooth to a welding condition is insufficient to heat the conductor of much larger cross section afforded by the rake back with which it is contacted. Such tooth may even be fused down without materially heating such a back. Any union which may be afforded by dextrous manipulation of tooth and rake back will be weak and will readily tear apart, the union, so far as the back is concerned, being merely superficial.

In the present invention, the holding element, as, for instance, the back of a rake, is first provided with a spur or lug either projecting from its surface or counter-sunk therein. This spur or lug is made with a cross section equal to, or, advantageously, somewhat less than, that of the tooth or tine to be welded to such back. By making it of somewhat less cross section, the heat withdrawing influence of the larger mass of metal in the back is counteracted. Upon placing the lug in contact with the base or tine of the tooth and passing a welding current through the contacting portions, the two elements will soften equally and a coalescent and integral union can readily be effected. As soon as such coalescence is effected, the welding current is withdrawn.

According to the present invention the spurs or lugs on the back of a rake, for example, can be made by forging small projections along the back of the rake at suitable intervals, depending upon the number of tines, by stamping or forging the metal to produce this result. The back of the rake is then put into a suitable welding machine and the tines welded to the projections on the back by passing a welding electrical current through the same and simultaneously pressing the tines and the back of the rake together. The tine and the back of the rake are pressed together so that the welding metal at the point of union will be upset so as to produce a flange or base which bears upon the top of the back of the rake and gives an additional rigidity to the tine.

Instead of providing the back of the rake with small projections or lugs which project above the surface thereof, the same result can be accomplished by providing the back of the rake with pairs of transverse grooves which are spaced at suitable intervals along the back of the rake, one pair of grooves being provided for each tine. In this manner the back of the rake can be provided with a plurality of lugs which do not project above the surface of the back of the rake and the same can be brought to the desired temperature by varying the distance apart of the grooves and by varying the depth of the same so as to produce the same welding temperature on the lug as on the end of the tine.

By providing the back of the rake with grooves it will be seen that the upset metal which is formed when the tine is welded to the back of the rake by the same being pressed together while in a welding condition, will be pressed into the grooves and fill the same so as to make a neat joint where the tines join the back of the rake; the tine being braced by means of the metal adjacent the grooves on the back of the rake, and by the upset metal or flange on the end of the tine which bears upon the back of the rake.

Referring to the drawings: Figure 1 is a side view in elevation of a portion of the back of a rake which is provided with small projections or lugs which extend above the surface of the back thereof. In the same figure is also shown the tines or teeth which are placed above the projections on the back of the rake; Fig. 2 is a perspective view of the back of the rake shown in Fig. 1; Fig. 3 is a view similar to that shown in Fig. 1, in which the small projections or lugs on the back of the rake are formed by pairs of transverse grooves; Fig. 4 is a plan view of an apparatus illustrating suitable apparatus for carrying out the process; Fig. 5 is a side view of Fig. 4; Fig. 6 is a detail view of a tine welded to the back of a rake as shown in Fig. 1; Fig. 7 is a detail view of a tine welded to the back of a rake as shown in Fig. 3.

In the drawings A designates a portion of the back of a rake provided with projections or lugs B, and C designates the tines or teeth of the rake adapted to be welded to the projections or lugs B. The object of forming the projections B on the back of the rake is to reduce the cross sectional area at the point of weld on the back of the rake, so as to heat the end of the tine, and the point to which the tine is to be welded, to substantially the same temperature when a current of electricity is passed through the back A and the tine C. After the end of the tine C and the projection B have been heated to the proper temperature, the same are forced together to complete the weld. The forcing together of the tine and the projection when in a welding condition is continued so that the metal while in a welding or heated condition is upset to form an upset or flanged portion D on each side of the bottom of the tine, as shown in Fig. 6. The upset portion D is not necessarily welded to the back of the rake, as the welding current is short circuited when the same are forced together in the final operation of welding. The upset or flanged portion D acts as a brace to stiffen the tine and for that reason is very advantageous. Any bur which forms at the edges of the upset or bracing portion D can be readily removed by a file or chisel so as to give a neat appearance to the finished rake.

By referring to Fig. 3 it will be seen that the back of the rake A' is provided with a series of pairs of transverse slots or grooves E, one pair for each tine C'. Each pair of grooves E are preferably so spaced that the end of the tine C' will engage only the isolated portion or projection B' between each pair of grooves, the grooves E being made of sufficient depth to heat the projection B' to substantially the same temperature as the end of the tine C' when a current of electricity is passed through the back of the rake A' and the tine C'. After the end of the tine C' and the projection B' have been heated to the proper temperature, the same are forced together to complete the weld, the same being forced together so that the welded metal will be upset at the point of welded union so as to entirely close the grooves E, the same being not necessarily welded together, although the outward appearance of the welded union does not disclose either of the grooves E, as the projection B' is upset so as to fill the grooves E while the lower end of the tine C' is preferably upset so as to overlap the top of the grooves and form an upset portion D' which acts as a brace to the tine, as shown in Fig. 7. A tine welded in this manner to the back of a rake has an upset portion D' which extends over a portion of the top of the back of the rake above the welded union which is situated slightly below the top surface of the back of the rake, and the bur which usually forms around the edges of a welded union is thereby prevented from forming on the sides of the tines, the upset portion D' in the present instance being made by the metal above the lower end of the tine, which when upset broadens out without making a bur.

It is obvious that the upset portion which extends beyond the sides of the back of the rake between the two grooves can readily be removed by a single operation of grinding. It is also obvious that the upset portions D' can be dispensed with by not further upsetting the tines after the welded union has been made.

By the above method it will be seen that a plurality of tines can be welded to the back of a rake or similar article in a very easy and economical manner so that the tines will not only be firmly welded to the back of the rake but will also be provided with additional stiffening means to strengthen the tines. When the projections on the back of the rake extend above the surface of the same the upset portion rests upon the top of the back of the rake and braces the tines, whereas when the back of the rake is provided with grooves the upset portion fills the grooves and the tines are braced by the metal adjacent the grooves on the back of the rake, and when the end of the tines are upset the tines are also braced by the upset portions which bear upon the top of the back of the rake.

In Fig. 4, K represents a suitable abutment on a welding machine against which the back A of the rake is placed, while the tine C is clamped between the members O provided with suitable clamping bolts L. The abutment K and the clamping members O are included in a suitable electric circuit by means of the wires 1 and 2 which lead to a source of supply 3 as a generator. A suitable switch 4 may be included in the circuit. When the circuit is completed by contact between the tine C and the back A, the high resistance of the parts in contact causes them to heat and at the same time the tine is forced against the back by any suitable means, thereby forming an electric weld, after which the metal is upset and the current cut off and the process is repeated for the remainder of the tines. The tines may, of course, be welded on to the back one at a time or all together as desired, and suitable automatic machines may be designed for welding the tines successively on to the back.

This application is a division of my copending application Sr. No. 339,339, filed October 17, 1906, and renewed November 29, 1907, Sr. No. 404,377.

What I claim is:—

1. The process of electrically welding the end or butt of one piece of metal to the flat surface of another to form objects of angle or T-shapes, which consists in forming on the side of one such part a superficial area at the point of intended weld corresponding substantially to the butt area of the other part which is to be welded thereon, and partially isolating said superficial area from the remainder of the area of that part, placing the parts together with the butt of the second part in contact with the superficial area of the first part, passing a welding current through said parts, and simultaneously therewith forcing them together and continuing to force the pieces of metal together so as to upset the metal to form a flange about the welded union, then interrupting the flow of current as soon as the two abutting surfaces have formed a welded union.

2. The process of electrically welding the end or butt of one piece of metal to the flat surface of another to form objects of angle or T-shapes, which consists in forming an isolated portion on the side of one such part to reduce the superficial area of such part at the point of intended weld corresponding substantially to the area of that portion of the other part which is to be welded thereon, placing the parts together with the butt of the second part in contact with the isolated portion of the first part, passing a welding current through said parts and simultaneously therewith forcing them together, and continuing to force the pieces of metal together so as to upset the metal to form a flange about the welded union, then interrupting the flow of current as soon as the two abutting surfaces have formed a welded union.

3. The process of electrically welding the end or butt of one piece of metal to the flat surface of another to form objects of angle or T-shape, which consists in forming on the side of one part a pair of grooves to reduce the superficial area of such part at the point of intended weld, placing the butt of the other part between said grooves, passing a welding current through said parts and simultaneously therewith forcing them together and continuing to force the pieces of metal together so as to upset the metal to form a flange about the welded union, then interrupting the flow of current as soon as the two abutting surfaces have formed a weld.

In testimony whereof I have signed this specification in the presence of two subscribing witnesses.

MAURICE LACHMAN.

Witnesses:
LEO J. MATTY,
FRANK E. RAFFMAN.